United States Patent
Zhao et al.

(10) Patent No.: US 12,553,657 B2
(45) Date of Patent: Feb. 17, 2026

(54) CONTROL METHOD AND DEVICE OF ICE MAKING DEVICE AS WELL AS REFRIGERATOR

(71) Applicants: QINGDAO HAIER REFRIGERATOR CO., LTD, Qingdao (CN); HAIER SMART HOME CO., LTD., Qingdao (CN)

(72) Inventors: Bintang Zhao, Qingdao (CN); Bin Fei, Qingdao (CN)

(73) Assignees: QINGDAO HAIER REFRIGERATOR CO., LTD, Qingdao (CN); HAIER SMART HOME CO., LTD., Qingdao (CN)

( * ) Notice: Subject to any disclaimer, the term of this patent is extended or adjusted under 35 U.S.C. 154(b) by 152 days.

(21) Appl. No.: 18/560,047

(22) PCT Filed: May 9, 2022

(86) PCT No.: PCT/CN2022/091706
§ 371 (c)(1),
(2) Date: Nov. 9, 2023

(87) PCT Pub. No.: WO2022/237724
PCT Pub. Date: Nov. 17, 2022

(65) Prior Publication Data
US 2024/0247861 A1    Jul. 25, 2024

(30) Foreign Application Priority Data

May 10, 2021  (CN) .......................... 202110503911.6

(51) Int. Cl.
*F25D 21/06*  (2006.01)
*F25C 1/00*   (2006.01)

(52) U.S. Cl.
CPC ................. *F25D 21/06* (2013.01); *F25C 1/00* (2013.01); *F25C 2400/14* (2013.01); *F25C 2600/04* (2013.01)

(58) Field of Classification Search
CPC .... F25C 1/00; F25C 2400/14; F25C 2600/04; F25C 2500/08; F25C 1/04; F25C 1/25;
(Continued)

(56) References Cited

U.S. PATENT DOCUMENTS 10,760,844 B1    9/2020   Zhang et al.

FOREIGN PATENT DOCUMENTS

CN         1453551 A      11/2003
CN       101206092 A       6/2008
(Continued)

*Primary Examiner* — Kun Kai Ma
(74) *Attorney, Agent, or Firm* — MUNCY, GEISSLER, OLDS & LOWE, P.C.

(57) ABSTRACT

A control method and system of an ice making device as well as a refrigerator having the same. The control method includes receiving first detection data of a detection sensor on an ice-making water injection pipe after ice is turned over and before water is injected; judging whether ice exists in the ice-making water injection pipe according to the first detection data; and turning on a heating assembly when ice exists in the ice-making water injection pipe. In the control method of an ice making device according to the present invention, the detection sensor is provided, whether the water injection pipe is frozen is judged by the detection sensor detecting whether ice exists, the detection method is more accurate, a freezing state of the ice-making water injection pipe can be known more accurately, and the heating assembly can be turned on more efficiently to unfreeze the ice-making water injection pipe.

9 Claims, 4 Drawing Sheets

(58) Field of Classification Search
CPC .......... F25D 21/06; F25D 29/00; F25D 11/02; F25D 21/08
See application file for complete search history.

(56) References Cited

FOREIGN PATENT DOCUMENTS

| | | | | |
|---|---|---|---|---|
| CN | 102735001 | A | | 10/2012 |
| CN | 103292536 | A | * | 9/2013 |
| CN | 203274430 | U | | 11/2013 |
| CN | 103851877 | A | | 6/2014 |
| CN | 203798078 | U | | 8/2014 |
| CN | 205951912 | U | | 2/2017 |
| CN | 206399362 | U | | 8/2017 |
| CN | 110608569 | A | | 12/2019 |
| CN | 111452979 | A | | 7/2020 |
| CN | 212081741 | U | | 12/2020 |
| CN | 113970219 | A | * | 1/2022 ............... F25D 11/02 |
| DE | 102012202790 | A1 | | 8/2013 |
| JP | 1996303915 | A | | 11/1996 |
| JP | 1997068374 | A | | 3/1997 |
| JP | 2002243330 | A | * | 8/2002 |
| JP | 2002267303 | A | | 9/2002 |
| JP | 2007085566 | A | | 4/2007 |
| JP | 2007255804 | A | | 10/2007 |
| JP | 2007303797 | A | * | 11/2007 |
| JP | 2008020158 | A | * | 1/2008 |
| JP | 2008304166 | A | * | 12/2008 |
| JP | 2009068815 | A | * | 4/2009 |
| JP | 2011127858 | A | | 6/2011 |
| JP | 2012077947 | A | * | 4/2012 |
| JP | 2015081727 | A | * | 4/2015 |
| JP | 2015094510 | A | * | 5/2015 |
| KR | 970001294 | B1 | * | 2/1997 ............... F25D 11/02 |
| KR | 1020060039094 | A | | 5/2006 |
| KR | 20150071982 | A | * | 6/2015 ................ F25C 5/22 |
| KR | 20190100119 | A | * | 8/2019 ................ F25C 1/24 |

* cited by examiner

CONTROL METHOD AND DEVICE OF ICE MAKING DEVICE AS WELL AS REFRIGERATOR

TECHNICAL FIELD

The present invention relates to the field of ice making apparatuses, and in particular, to a control method and device of an ice making device as well as a refrigerator.

BACKGROUND

Currently, in order to facilitate use of users, a plurality of refrigerator products are provided therein with automatic ice makers. In the automatic ice maker, water is generally required to be injected through a water injection pipe for ice making.

When the ice maker is provided on a freezing chamber or a freezing door of a refrigerator, part of the water injection pipe is located in a freezing environment, such that the water injection pipe is prone to freezing. In a prior art, a temperature sensor and a heating wire are generally provided, and the heating wire is turned on to unfreeze the frozen water injection pipe when a temperature near the water injection pipe is detected to be lowered to a preset temperature. However, the temperature detection method has a large error, a freezing state of the water injection pipe cannot be accurately obtained, and a problem that power cannot be timely increased to unfreeze a frozen position or energy waste is caused may be caused.

SUMMARY

An object of the present invention is to provide a control method and device of an ice making device as well as a refrigerator.

In order to realize the above inventive purposes, an embodiment of the present invention provides a control method of an ice making device, comprising: receiving first detection data of a detection sensor on an ice-making water injection pipe after ice is turned over and before water is injected; judging whether ice exists in the ice-making water injection pipe according to the first detection data; and turning on a heating assembly when ice exists in the ice-making water injection pipe.

As a further improvement of the present invention, wherein after the step of turning on a heating assembly when ice exists in the ice-making water injection pipe, the method further comprises: judging whether a first heating time is exceeded; when the first heating time is not exceeded, receiving second detection data of the detection sensor at an interval of a second heating time, the second heating time being shorter than the first heating time; judging whether ice exists in the ice-making water injection pipe according to the second detection data; and turning off the heating assembly when no ice exists in the ice-making water injection pipe.

As a further improvement of the present invention, wherein after the step of judging whether a first heating time is exceeded, the method further comprises: turning off the heating assembly when the first heating time is exceeded; and displaying ice-making water injection pipe freezing information on a display panel.

As a further improvement of the present invention, wherein after the step of turning off the heating assembly when no ice exists in the ice-making water injection pipe, the method further comprises: removing an ice-making water injection pipe freezing mark.

As a further improvement of the present invention, wherein after the step of turning on a heating assembly when ice exists in the ice-making water injection pipe, the method further comprises: setting the ice-making water injection pipe freezing mark and stopping the ice making procedure.

As a further improvement of the present invention, wherein before the step of receiving first detection data of a detection sensor after ice is turned over and before water is injected, the control method of an ice making device further comprises: checking whether a no-water mark is set after an ice making operation is finished; further checking whether the ice-making water injection pipe freezing mark is set when the no-water mark is not set; and performing an ice turnover operation when the ice-making water injection pipe freezing mark is not set.

As a further improvement of the present invention, wherein before the step of receiving first detection data of a detection sensor after ice is turned over and before water is injected, the control method of an ice making device further comprises: performing a water injection operation; receiving third detection data of the detection sensor; judging whether water exists in the ice-making water injection pipe according to the third detection data; when no water exists in the ice-making water injection pipe, continuously receiving data of N+1 times of detection of the detection sensor, N being an integer greater than zero; judging whether water exists in the ice-making water injection pipe according to the data of the N+1 times of detection; and setting the no-water mark when no water exists in the ice-making water injection pipe.

As a further improvement of the present invention, wherein after the step of judging whether water exists in the ice-making water injection pipe according to the third detection data, the method further comprises: when water exists in the ice-making water injection pipe, waiting for completion of water injection and executing the ice making procedure.

Another aspect of the present invention provides an ice making device, comprising: a detection sensor configured to detect whether water or ice exists in an ice-making water injection pipe; and a control module comprising a memory and a processor, the memory storing a computer program operable on the processor, and the processor implementing steps of the control method of an ice making device according to any one of claims 1 to 8 when executing the program.

Another aspect of the present invention provides a refrigerator, comprising a refrigerating chamber and a freezing chamber, wherein the freezing chamber is provided therein with an ice making device, the ice making device comprises an ice making tray and an ice-making water injection pipe for supplying water to the ice making tray, and the refrigerator further comprises the control system of an ice making device according to claim 9; a water outlet of the ice-making water injection pipe is provided above the ice making tray in the freezing chamber; a detection sensor and a heating assembly are provided on the ice-making water injection pipe, and the heating assembly is provided around an outer wall of the ice-making water injection pipe; the detection sensor is configured as a capacitive sensor.

Compared with a prior art, in the control method of an ice making device according to the present invention, a detection sensor is provided, and whether an ice-making water injection pipe is frozen is judged by the detection sensor detecting whether water exists in the ice-making water injection pipe after ice is turned over and before water is injected, the detection method is more accurate, a freezing state of the ice-making water injection pipe can be known more accurately, and the heating assembly can be turned on more efficiently to unfreeze the ice-making water injection pipe.

DETAILED DESCRIPTION

Figure 1:
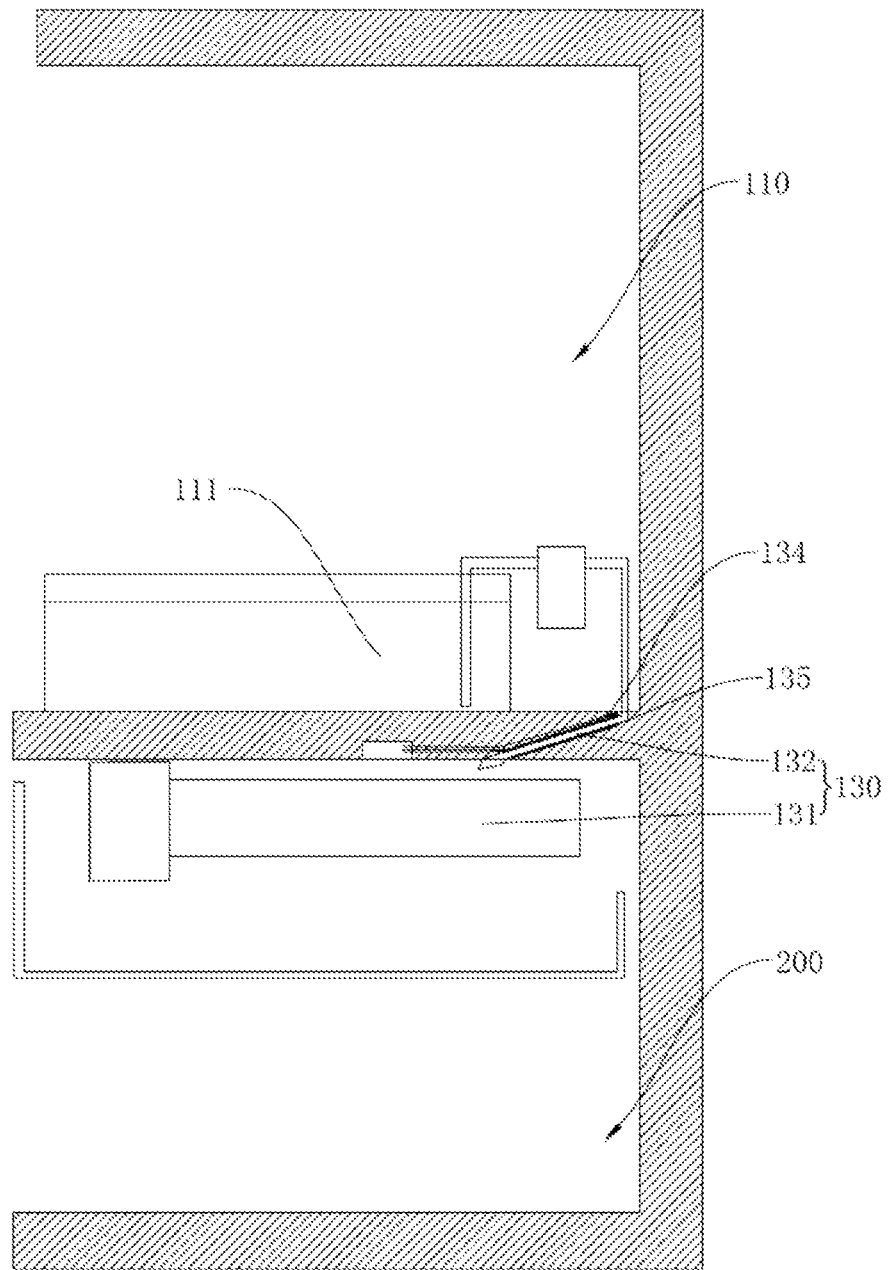
FIG. 1 is a schematic structural diagram of a refrigerator according to an embodiment of the present invention.

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

It should be understood that the terms expressive of spatial relative positions, such as "upper", "above", "lower", "below", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings.

As shown in FIG. 1, the present invention discloses a refrigerator 100 including a refrigerating chamber 110 and a freezing chamber 120. An ice making device 130 is provided in the freezing chamber, and includes an ice making tray 131 and an ice-making water injection pipe 132 for supplying water to the ice making tray. The refrigerator further includes a control system 140 of the ice making device. A water outlet 133 of the ice-making water injection pipe 132 is provided above the ice making tray 131 in the freezing chamber 120. The ice-making water injection pipe 132 is provided with a detection sensor 134 and a heating assembly 135, and the heating assembly 135 is provided around an outer wall of the ice-making water injection pipe 132. The detection sensor 134 is configured as a capacitive sensor.

In an embodiment of the present invention, a water storage container 111 is provided in the refrigerating chamber 110, and the water storage container 111 is connected with the ice-making water injection pipe 132 to supply water to the ice-making water injection pipe 132. In other embodiments, an external water source may be provided to be connected with the ice-making water injection pipe, so as to supply water to the ice-making water injection pipe.

The ice-making water injection pipe 132 is required to supply water to the ice making tray 131, and water droplets may remain in the ice-making water injection pipe 132 after water injection. Since part of the ice-making water injection pipe 132 is located in the freezing chamber 120, the water remaining in ice-making water injection pipe 132 may be frozen. The ice-making water injection pipe 132 cannot supply water to the ice making tray 131 any more after freezing, such that an ice making procedure cannot continue.

In the embodiment of the present invention, the heating assembly 135 is configured as a heating wire. The heating wire is wound around the outer wall of the ice-making water injection pipe 132, so as to unfreeze the ice-making water injection pipe 132 when turned on.

Figure 2:
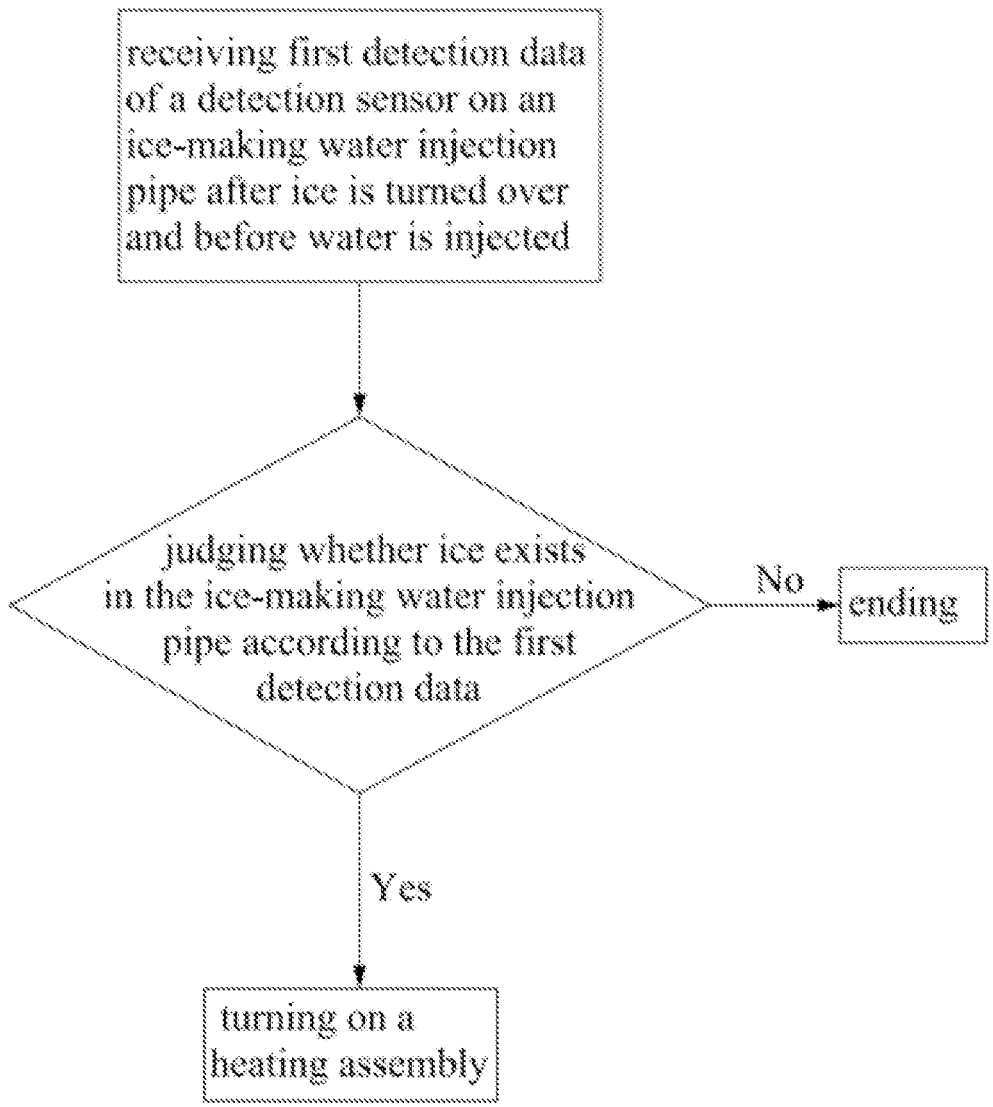
FIG. 2 is a schematic flow diagram of a control method of an ice making device according to an embodiment of the present invention.
Figure 3:
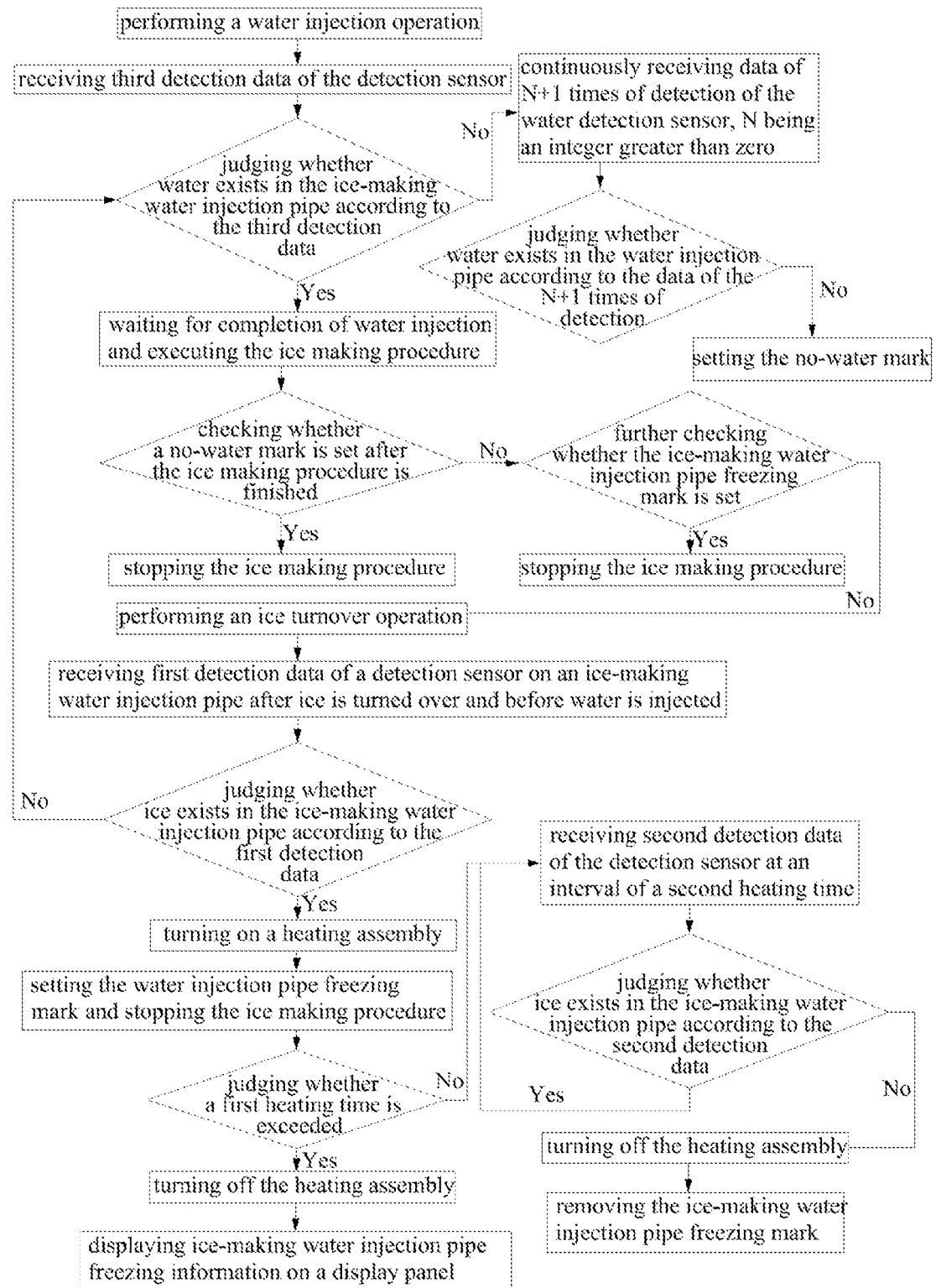
FIG. 3 is a schematic flow diagram of the control method of an ice making device according to the embodiment of the present invention.

As shown in FIGS. 2 to 3, an embodiment of the present invention discloses a control method of an ice making device. As shown in FIG. 1, the method includes:
  receiving first detection data of a detection sensor 134 on an ice-making water injection pipe 132 after ice is turned over and before water is injected;
  judging whether ice exists in the ice-making water injection pipe 132 according to the first detection data; and
  turning on a heating assembly 135 when ice exists in the ice-making water injection pipe 132.

In the embodiment of the present invention, the detection sensor 134 may be mounted on the outer wall of the ice-making water injection pipe 132. In the embodiment of the present invention, the detection sensor 134 is configured as a capacitive sensor. The capacitive sensor is configured as a variable dielectric type capacitor in which a change in a dielectric constant is caused by a change in a detected medium. Specifically, after ice is turned over and before water is injected, when the ice-making water injection pipe 132 is not frozen, the pipe is in an empty state, and at this point, the capacitive sensor generates a dielectric constant and sends detection data to the controller to indicate that no water exists in the ice-making water injection pipe; when the ice-making water injection pipe 132 is frozen and most or all of a space in the pipe is filled with the frozen ice, the detected medium is changed, which causes the dielectric constant of the capacitive sensor to change, such that the sensor sends another detection data to the controller to indicate that ice exists in the ice-making water injection pipe. Therefore, whether the ice-making water injection pipe is frozen may be judged according to different detection data. The capacitive sensor has a large detection dynamic range, a high response speed, a simple structure and a low cost.

In other embodiments, other types of sensors, such as a photoelectric sensor, or the like, may be used.

When the ice is determined to be present in the ice-making water injection pipe 132, the ice-making water injection pipe 132 is frozen, and the heating assembly 135 is required to be turned on to unfreeze the ice-making water injection pipe 132.

Further, in an embodiment of the present invention, after the step of turning on a heating assembly 135 when ice exists in the ice-making water injection pipe, the control method of an ice making device further includes:
  judging whether a first heating time is exceeded;
  when the first heating time is not exceeded, receiving second detection data of the detection sensor 134 at an interval of a second heating time, the second heating time being shorter than the first heating time;
  judging whether the ice exists in the ice-making water injection pipe 132 according to the second detection data; and
  turning off the heating assembly 135 when no ice exists in the ice-making water injection pipe.

In the embodiment of the present invention, the first heating time is a long period; for example, the first heating time may be 0.5 hours or 1 hour. Specifically, the first heating time may be preset in advance, or a plurality of tests of unfreezing the ice-making water injection pipe may be performed to determine a time required for unfreezing the ice-making water injection pipe in most cases, and the first heating time is set accordingly. For example, after the plurality of tests, a maximum time for unfreezing the ice-making water injection pipe in most cases is measured to 1 hour, and then, the first heating time may be set to 1 hour.

When the first heating time is not exceeded, the second detection data of the detection sensor 134 is received at the interval of the second heating time. The second heating time may be short, for example, 5 seconds, 10 seconds, or the like. That is, the controller receives the second detection data of the detection sensor 134 at the interval of 5 seconds or 10 seconds within the first heating time not exceeding 0.5 hours or 1 hour, so as to know in time whether the ice-making water injection pipe 132 is unfrozen in a state where the heating assembly 135 is turned on.

Similarly, when the received second detection data indicates that the ice is present in the ice-making water injection pipe 132, the ice-making water injection pipe 132 may be determined to be still frozen; when the second detection data received at this point indicates that no ice exists in the ice-making water injection pipe 132, the ice-making water injection pipe 132 may be determined to be unfrozen under operation of the heating assembly 135.

When no ice is determined to be present in the ice-making water injection pipe, the ice-making water injection pipe 132 is unfrozen, and at this point, the heating assembly 135 is not required to be continuously turned on, and the controller may turn off the heating assembly 135.

Thus, by judging whether the ice exists in the ice-making water injection pipe 132 at the interval of the short second heating time, a freezing state of the ice-making water injection pipe 132 can be known in time, and the heating assembly 135 is turned off after the ice-making water injection pipe 132 is unfrozen, thus improving an unfreezing efficiency and reducing energy consumption.

Further, in an embodiment of the present invention, after the step of judging whether a first heating time is exceeded, the control method of an ice making device further includes:
  turning off the heating assembly 135 when the first heating time is exceeded; and
  displaying ice-making water injection pipe freezing information on a display panel.

In the embodiment of the present invention, whether the ice exists in the ice-making water injection pipe 132 is judged at the interval of the second heating time, and when the heating assembly 135 is not turned off after plural times of detection are performed and the first heating time is exceeded, a frozen volume of the ice-making water injection pipe 132 may be excessively large, the heating assembly 135 is insufficient to unfreeze the frozen volume, a user may be required to perform unfreezing by using another method, or intervention of a maintenance person is required. At this point, the heating assembly 135 is useless and thus turned off.

The ice-making water injection pipe 132 freezing information is displayed on the display panel to remind the user that the ice-making water injection pipe is frozen, the heating assembly cannot unfreeze the ice-making water injection pipe, and the user is required to perform unfreezing by adopting other methods. The ice-making water injection pipe 132 freezing information may be characters, a picture or an icon, or in another form which can draw attention.

Further, in an embodiment of the present invention, after the step of turning off the heating assembly 135 when no ice exists in the ice-making water injection pipe, the method further includes:
  removing an ice-making water injection pipe freezing mark.

When the ice-making water injection pipe freezing mark is set in the previous step, after no ice is determined to exist in the ice-making water injection pipe, the ice-making water injection pipe freezing mark can be removed, such that the ice making procedure can be executed normally.

It should be noted that the ice-making water injection pipe freezing mark and the ice-making water injection pipe freezing information are different from each other. The ice-making water injection pipe freezing mark indicates that the ice-making water injection pipe is in a frozen state at this point, and when the ice-making water injection pipe is unfrozen (for example, after the heating assembly runs for a period of time), the ice-making water injection pipe freezing mark is removed. The ice-making water injection pipe freezing mark is a mark in the procedure and invisible to the user. The ice-making water injection pipe freezing information indicates that the ice-making water injection pipe cannot be unfrozen after the heating assembly operates, and the user is required to perform unfreezing using other methods. The ice-making water injection pipe freezing information is displayed on the display panel of the refrigerator and is visible to the user.

Further, in an embodiment of the present invention, after the step of turning on a heating assembly 135 when ice exists in the ice-making water injection pipe, the method further includes:
  setting the ice-making water injection pipe freezing mark and stopping the ice making procedure.

When the heating assembly 135 is required to be turned on, the ice-making water injection pipe 132 is frozen at this point, the ice making procedure cannot be normally executed, and therefore, the ice-making water injection pipe 132 freezing mark is set inside the procedure, and the controller is required to stop the ice making procedure.

Further, in an embodiment of the present invention, before the step of receiving first detection data of a detection sensor after ice is turned over and before water is injected, the control method of an ice making device further includes:
  checking whether a no-water mark is set after an ice making operation is finished;
  further checking whether the ice-making water injection pipe 132 freezing mark is set; and
  performing an ice turnover operation.

The no-water mark indicates that a water source (for example, the water storage container in the refrigerator or the external water source) has no water or cannot supply water to the ice-making water injection pipe 132. When the no-water mark is set, no water is present or water cannot be supplied, and the ice making procedure cannot be continuously executed. Therefore, before a next ice making operation, whether the no-water mark is set in the procedure may be checked first.

When the no-water mark is not set after checking, whether the ice-making water injection pipe 132 freezing mark is set is further checked, and when the ice-making water injection pipe 132 freezing mark is set, the ice-making water injection pipe 132 is frozen at this point, the ice-making water injection pipe 132 cannot normally supply water to the ice making tray, and the ice making procedure cannot be continuously executed.

When both the no-water mark and the ice-making water injection pipe 132 freezing mark are not set, the water source can normally supply water to the ice-making water injection pipe 132, the ice-making water injection pipe 132 can also normally supply water to the ice making tray, and at this point, the ice turnover operation is continuously performed, and then, a water injection operation before a next ice making procedure is performed.

Further, in an embodiment of the present invention, before the step of receiving first detection data of a detection sensor after ice is turned over and before water is injected, the control method of an ice making device further includes:

performing a water injection operation;

receiving third detection data of the detection sensor;

judging whether water exists in the ice-making water injection pipe according to the third detection data;

when no water exists in the ice-making water injection pipe, continuously receiving data of N+1 times of detection of the detection sensor, N being an integer greater than zero;

judging whether water exists in the ice-making water injection pipe according to the data of the N+1 times of detection; and setting the no-water mark when no water exists in the ice-making water injection pipe.

When the water injection operation is performed, both the no-water mark and the ice-making water injection pipe 132 freezing mark may be determined not to be set.

During the water injection operation, the controller may also receive the third detection data of the detection sensor 134. Since the ice making device performs the water injection operation at this point, when water exists in the ice-making water injection pipe 132, the water injection operation is normally performed, and when no water exists in the ice-making water injection pipe 132, the water source (for example, the water storage container in the refrigerator or the external water source) has no water or cannot supply water to the ice-making water injection pipe 132.

When no water is determined to be in the ice-making water injection pipe 132 according to the third detection data, the data of the N+1 times of detection of the detection sensor 134 is continuously received, N being an integer greater than zero. For example, N may be 2, 5, or the like.

The detection data of the detection sensor 134 is received a plurality of times, and judgment is performed, so as to prevent misjudgment, and when results of the plurality of times of judgment indicate that no water exists in the ice-making water injection pipe 132, the water source may be determined to have no water or determined not to be capable of supplying water to the ice-making water injection pipe 132.

When the judgment results of the data of the plural times of detection indicate that no water exists in the ice-making water injection pipe 132, the no-water mark may be set. When the no-water mark is set, the water source has no water or cannot supply water, and the ice making procedure cannot be continuously executed. Therefore, the controller may first check whether the no-water mark is set in the procedure before the next ice making operation.

Further, in an embodiment of the present invention, after the step of judging whether water exists in the ice-making water injection pipe according to the third detection data, the method further includes:

when water exists in the ice-making water injection pipe, waiting for completion of water injection and executing the ice making procedure.

At this point, the water injection operation is performed, and therefore, when water is present in the ice-making water injection pipe 132, the water injection operation is normally performed, and the ice making procedure may be performed after water injection is finished.

Figure 4:
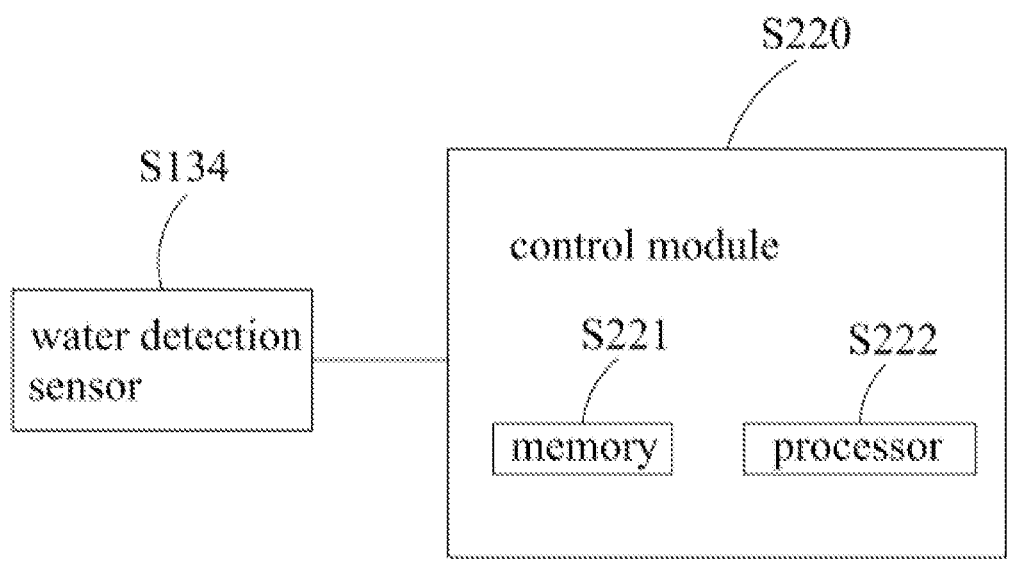
FIG. 4 is a schematic structural diagram of a control system of an ice making device according to an embodiment of the present invention.

Reference is made to FIG. 4 which shows a control system 200 of an ice making device according to an embodiment of the present invention. As shown in FIG. 4, the control system may include:

a detection sensor 134 configured to detect whether water or ice exists in an ice-making water injection pipe 132; and a control module 220 including a memory 221 and a processor 222, the memory 221 storing a computer program operable on the processor 222, and the processor 222 implementing steps of the above-mentioned control method of an ice making device when executing the program.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments may be combined properly to form other embodiments which may be understood by those skilled in the art.

A series of the detailed descriptions set forth above is merely specific description of feasible embodiments of the present invention, and is not intended to limit the protection scope of the present invention. Equivalent embodiments or modifications made within the spirit of the present invention shall fall within the protection scope of the present invention.

What is claimed is:

1. A control method of an ice maker, comprising:

receiving first detection data of a detection sensor on an ice-making water injection pipe after ice is turned over and before water is injected;

judging whether ice exists in the ice-making water injection pipe according to the first detection data; and turning on a heating wire when ice exists in the ice-making water injection pipe, wherein after the step of turning on the heating wire when ice exists in the ice-making water injection pipe, the method further comprises:

judging whether a first heating time is exceeded;

when the first heating time is not exceeded, receiving second detection data of the detection sensor at an interval of a second heating time, the second heating time being shorter than the first heating time;

judging whether ice exists in the ice-making water injection pipe according to the second detection data; and turning off the heating wire when no ice exists in the ice-making water injection pipe.

2. The control method of the ice maker according to claim 1, wherein after the step of judging whether the first heating time is exceeded, the method further comprises:

turning off the heating wire when the first heating time is exceeded; and displaying ice-making water injection pipe freezing information on a display panel.

3. The control method of the ice maker according to claim 1 wherein after the step of turning off the heating wire when no ice exists in the ice-making water injection pipe, the method further comprises:

removing an ice-making water injection pipe freezing mark.

4. The control method of the ice maker according to claim 1, wherein after the step of turning on the heating wire when ice exists in the ice-making water injection pipe, the method further comprises:
setting the ice-making water injection pipe freezing mark and stopping the ice making procedure.

5. The control method of the ice maker according to claim 1, wherein before the step of receiving first detection data of the detection sensor after ice is turned over and before water is injected, the control method of the ice maker further comprises:
checking whether a no-water mark is set after an ice making operation is finished;
further checking whether the ice-making water injection pipe freezing mark is set when the no-water mark is not set; and
performing an ice turnover operation when the ice-making water injection pipe freezing mark is not set.

6. The control method of the ice maker according to claim 1,
wherein before the step of receiving first detection data of the detection sensor after ice is turned over and before water is injected, the control method of an ice maker further comprises:
performing a water injection operation;
receiving third detection data of the detection sensor;
judging whether water exists in the ice-making water injection pipe according to the third detection data;
when no water exists in the ice-making water injection pipe, continuously receiving data of N+1 times of detection of the detection sensor, N being an integer greater than zero;
judging whether water exists in the ice-making water injection pipe according to the data of the N+1 times of detection; and
setting the no-water mark when no water exists in the ice-making water injection pipe.

7. The control method of the ice maker according to claim 6, wherein after the step of judging whether water exists in the ice-making water injection pipe according to the third detection data, the method further comprises:
when water exists in the ice-making water injection pipe, waiting for completion of water injection and executing the ice making procedure.

8. A control system of the ice maker, comprising:
a detection sensor configured to detect whether water or ice exists in an ice-making water injection pipe; and
a control module comprising a memory and a processor, the memory storing a computer program operable on the processor, and the processor implementing steps of the control method of the ice maker according to claim 1 when executing the program.

9. A refrigerator, comprising a refrigerating chamber and a freezing chamber, wherein the freezing chamber is provided therein with the ice maker, the ice maker comprises the ice making tray and the ice-making water injection pipe for supplying water to the ice making tray, and the refrigerator further comprises the control system of the ice maker according to claim 8; a water outlet of the ice-making water injection pipe is provided above the ice making tray in the freezing chamber; the detection sensor and the heating wire are provided on the ice-making water injection pipe, and the heating wire is provided around an outer wall of the ice-making water injection pipe; the detection sensor is configured as a capacitive sensor.

* * * * *